(12) United States Patent
Villalon-Regalado (10) Patent No.: US 8,647,034 B2
(45) Date of Patent: Feb. 11, 2014

(54) SYSTEM AND METHOD FOR SECURING A LOAD ONTO A TRAILER

(76) Inventor: Jesus Villalon-Regalado, Houston, TX (US)

( * ) Notice: Subject to any disclaimer, the term of this patent is extended or adjusted under 35 U.S.C. 154(b) by 26 days.

(21) Appl. No.: 13/444,976

(22) Filed: Apr. 12, 2012

(65) Prior Publication Data

US 2013/0272814 A1 Oct. 17, 2013

(51) Int. Cl.
 *B61D 45/00* (2006.01)
(52) U.S. Cl.
 USPC .......................................... 410/103
(58) Field of Classification Search
 USPC ...................... 410/97, 98, 100, 101, 103, 106
 See application file for complete search history.

(56) References Cited

U.S. PATENT DOCUMENTS

| | | | | | |
|---|---|---|---|---|---|
| 1,516,489 | A | * | 11/1924 | Barton | 24/523 |
| 3,209,706 | A | * | 10/1965 | Broling | 410/99 |
| 3,240,473 | A | * | 3/1966 | Coffey et al. | 410/103 |
| 3,416,763 | A | * | 12/1968 | Moreno | 24/68 R |
| 4,607,990 | A | * | 8/1986 | Eggers | 410/2 |
| 5,118,232 | A | * | 6/1992 | Shuker | 410/98 |
| 5,145,299 | A | * | 9/1992 | Stephenson, Jr. | 410/100 |
| 5,186,586 | A | * | 2/1993 | Stephenson, Jr. | 410/100 |
| 5,441,371 | A | * | 8/1995 | Erke | 410/100 |
| 6,161,981 | A | * | 12/2000 | Dehlin | 403/43 |
| 7,390,155 | B1 | * | 6/2008 | Diaz et al. | 410/107 |
| 7,972,099 | B2 | * | 7/2011 | Leggett et al. | 410/103 |
| 8,025,469 | B2 | * | 9/2011 | Ruan | 410/103 |
| 8,025,470 | B2 | * | 9/2011 | Ruan | 410/103 |
| 8,272,820 | B2 | * | 9/2012 | Numata | 410/103 |
| 8,434,979 | B1 | * | 5/2013 | Genge | 410/103 |
| 2006/0099045 | A1 | * | 5/2006 | Sawchuk | 410/103 |
| 2007/0269285 | A1 | * | 11/2007 | Leggett | 410/100 |

* cited by examiner

*Primary Examiner* — H Gutman
(74) *Attorney, Agent, or Firm* — Spradley, PLLC; Michael Spradley (57) ABSTRACT

A system and method for securing a load onto a trailer is described. Specifically, a load-securing device can comprise a first casing mountable to a trailer, wherein said casing comprises a first front driveshaft access orifice and a first plate screw orifice, a first threaded driveshaft mounted in said casing wherein the first end of said first driveshaft is mateable with a first rotation actuator, further wherein the front end of said first threaded drive shaft is accessible by said first front driveshaft access orifice.

15 Claims, 8 Drawing Sheets

SYSTEM AND METHOD FOR SECURING A LOAD ONTO A TRAILER

BACKGROUND

This disclosure relates to a system and method for securing a load onto a trailer.

Over the years methods of transporting a load and securing it into a trailer has been a great challenge. One of the most popular and commonly used methods uses a lever device such as a 10 pound steel bar also known as cheater bar. As such one or more chains and/or straps are thrown over the load to wrap around the loads and the cheater bar is then used to torque down on a ratchet which has a nylon strap attached to it. This will bind the strap and firmly secures the load. However, this method requires more time and effort since a load can require up to 16 straps or more and tightening the chains firmly would need sufficient amount of force. Also, there will always be risk of injuries and accidents since the current system requires a lot of human force and human interaction. Additionally, such method may not be efficient for loads that are irregular in shape such as logs. Since, during transit loads with varying sizes and shapes tend to move and shift which can cause the chain to loosen and may even cause the loads to fall from the truck.

As such it would be useful to have an improved system and method for securing a load onto a trailer.

SUMMARY

A system and method for securing a load onto a trailer is described herein

In one embodiment, a load-securing device can comprise a first casing mountable to a trailer, wherein said casing comprises a first front driveshaft access orifice and a first plate screw orifice, a first threaded driveshaft mounted in said casing wherein the first end of said first driveshaft is mateable with a first rotation actuator, further wherein the front end of said first threaded drive shaft is accessible by said first front driveshaft access orifice. The load-securing device can also comprise a first plate screw mounted to said first casing, wherein said first plate screw passes through said first plate screw orifice, further wherein said first plate screw is perpendicular to said first threaded driveshaft, a first one or more gears configured to transfer rotational motion of said driveshaft to said first plate screw, and a first plate comprising a first threaded plate orifice, said first plate screw partially inside said first threaded plate orifice, further wherein said rotational motion of said first plate screw causes said first plate to move axially along said first plate screw.

Further, the load-securing device can also comprise a second threaded plate orifice in said first casing, a second plate screw mounted to said first casing, wherein said second plate screw passes through said second threaded plate orifice, further wherein said second plate screw is perpendicular to said driveshaft; furthermore wherein rotational motion of said second plate screw causes said plate to move axially along said second plate screw, and a second one or more gears configured to transfer rotational motion of said driveshaft to said second plate screw.

Moreover, the load-securing device can further comprise a guide parallel to said first plate screw orifice, a guide-mate connected to said first plate, wherein said guide is mateable with said guide mate, further wherein rotational motion of said first plate screw causes said guide to connectively slide with said guide mate.

In another embodiment, the load-securing device can comprise a second casing mountable to a trailer, wherein said second casing comprises a second rear driveshaft access orifice and a second plate screw orifice, a second threaded driveshaft mounted in said second casing, wherein the front end of said second drive shaft is accessible by said second front driveshaft access orifice, and a second plate screw mounted to said second casing, wherein said second plate screw passes through said second plate screw orifice, further wherein said second plate screw is parallel to said second threaded driveshaft. The load-securing device can further comprise a second one or more gears configured to transfer rotational motion of said second threaded driveshaft to said second plate screw, and a second plate comprising a second threaded plate orifice, said second plate screw inside said second plate screw orifice, further wherein rotational motion of said second plate screw causes said second plate to move axially along said second plate screw. Further in another embodiment, the load-securing device can also comprise a plate screw guide at least partially around said first plate screw, and a guide support, the first end of said guide support connected to said plate screw guide, and said the second end of said guide support connected to said first casing.

Additionally, a method for securing a load onto a trailer is disclosed. The method can comprise connecting the first end of a strapping device to one side of a trailer, placing said strapping device over a load on a trailer, and connecting the second end of said strapping device to a plate, said plate comprising a threaded plate orifice, a first plate screw partially inside said first threaded plate orifice, further wherein said rotational motion of said first plate screw causes said first plate to move axially along said first plate screw, said plate screw mounted to a casing, wherein said first plate screw passes through first plate screw orifice in said casing, further wherein said first plate screw is perpendicular to a driveshaft; said driveshaft mounted in said casing wherein the first end of said driveshaft is mateable with a rotation actuator, further wherein the front end of said driveshaft is accessible by a front driveshaft access orifice in said casing. The method can further comprise rotating said drive shaft with said rotation actuator.

DETAILED DESCRIPTION

Described herein is a system and method for securing a load onto a trailer. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
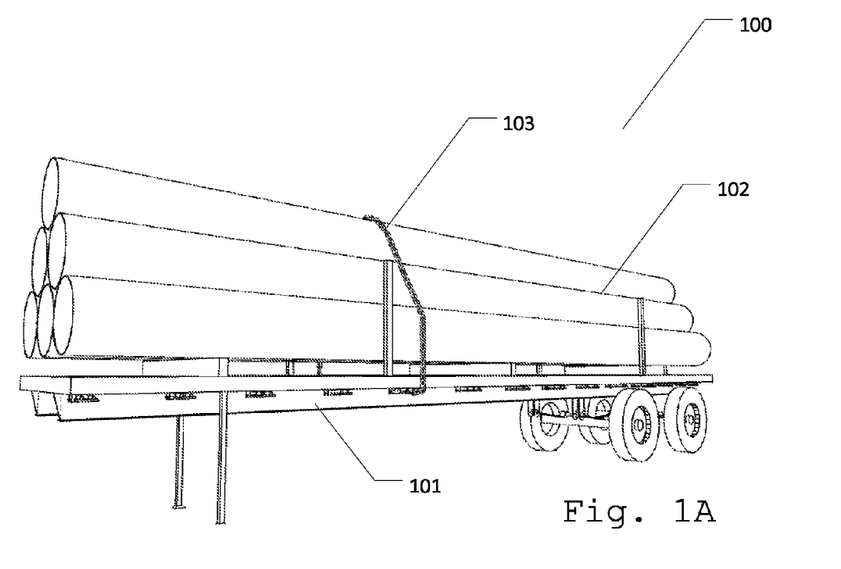
FIG. 1A illustrates a trailer comprising a load-securing system.
Figure 1B:
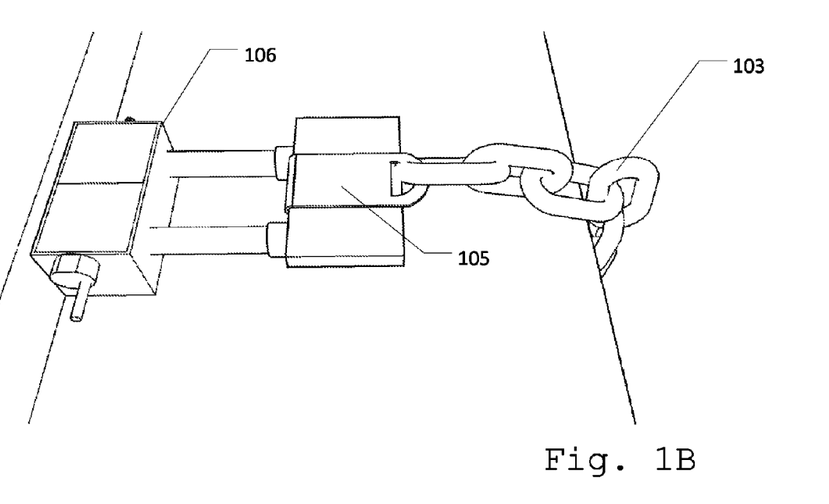
FIG. 1B illustrates a hook attached to load-securing device.
Figure 1C:
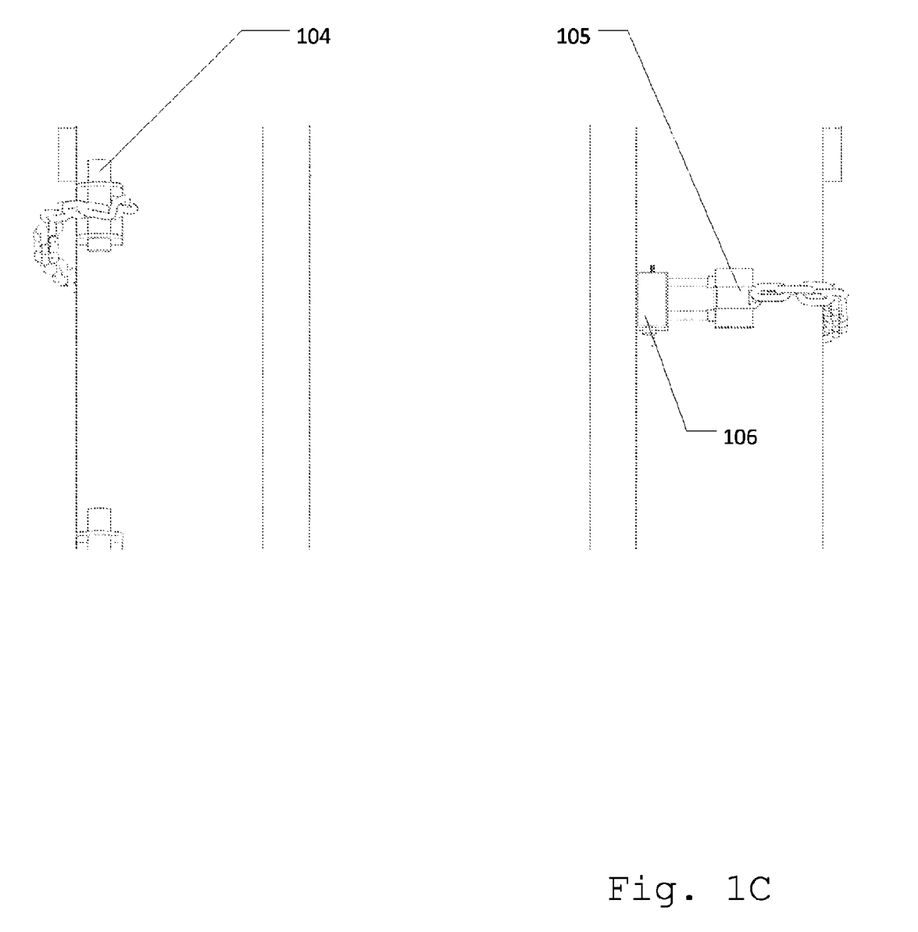
FIG. 1C illustrates a bottom view of truck load-securing system.

FIG. 1A illustrates load-securing system 100. FIG. 1B illustrates hook 105 attached to load-securing device 106. FIG. 1C illustrates bottom view of a trailer 101, showing how strapping device 103 can be attached on an anchor 104 and load-securing device 106. Load-securing system 100 can comprise a trailer 101, any load 102, any strapping devices 103, an anchor 104, a hook 105 and a load-securing device 106. For purposes of this disclosure trailer 101 can be any powered and/or unpowered vehicle used to carry and transport any type of goods or materials. Load 102 can be any cargo. Examples include, but are not limited to, steel pipe, tubing, logs, boxes, and/or containers. Load 102 can require one or more strapping devices 103 for load 102 to be tied down securely. Strapping device 103 can be any device used to tie down load 102 to trailer 101. Strapping device 103 can be made of steel or chain, nylon, webbing, wire or cord. One end of strapping device 103 can be spooled onto or otherwise connected to anchor 104. While the other end of strapping device 103 can have a hook 105 attached to it or any other connection device known in the art. Hook 105 can be any device used to clasp unto load-securing device 106. Furthermore, hook 105 can have a safety latch in order to prevent disengagement from load-securing device 106.

In one embodiment load-securing device 106 can be mounted permanently underneath a trailer through welding, brazing, cementing, etc. In another embodiment load-securing device 106 can be attached securely underneath the trailer using other fastening devices, such as, but not limited to, rivets, nuts and bolts, or screws.

Further, for purposes of this disclosure load-securing system 100 can comprise one or more load-securing device 106. As such, load-securing device 106 can either work as stand-alone or can be linked to one or more other load securing devices 106, working together as a system. In one embodiment each load-securing device 106 can be powered by an electric motor. In another embodiment load-securing system 100 can also use an electric motor to control load-securing devices 106 in the system.

Figure 2:
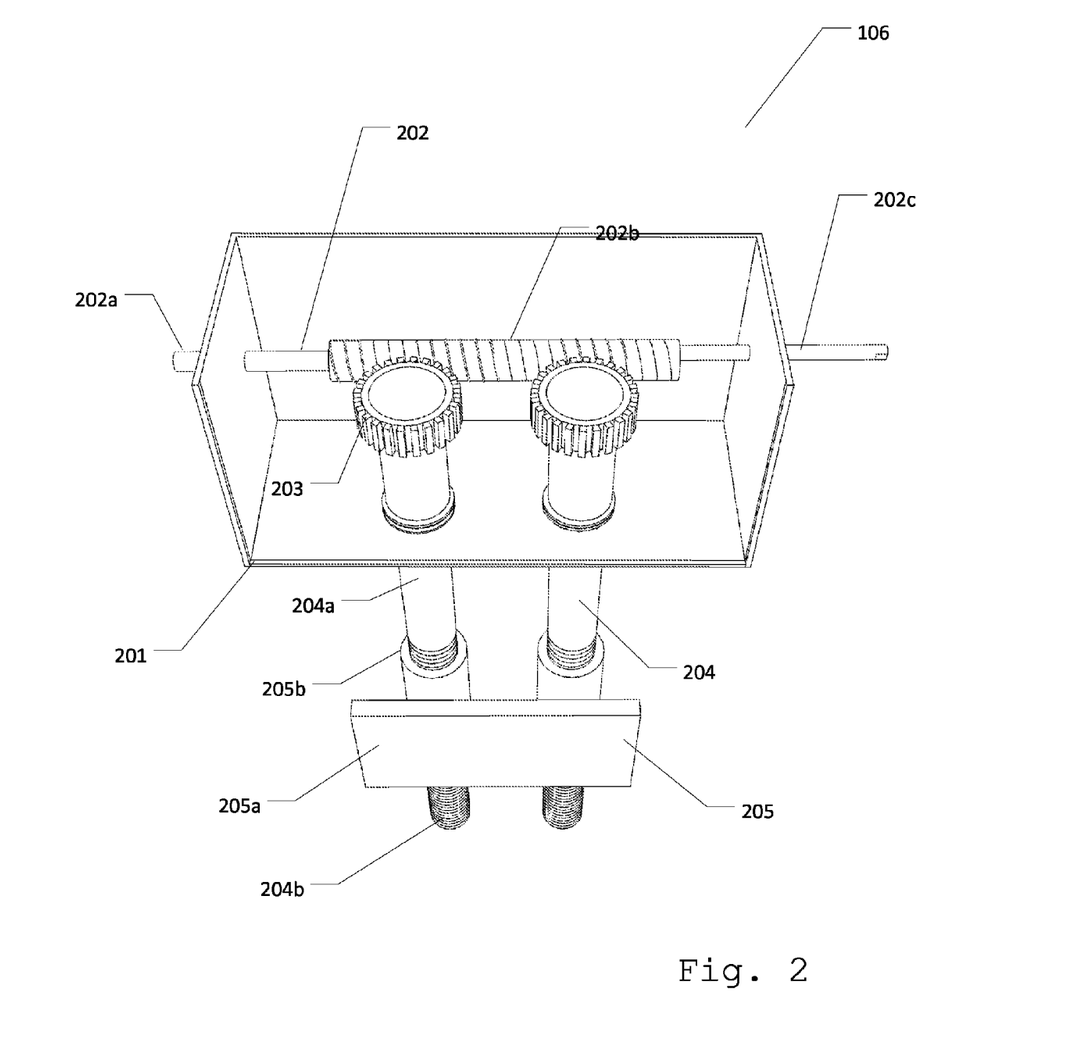
FIG. 2 illustrates a load-securing device comprising two plate screws.

FIG. 2 illustrates a load-securing device comprising two plate screws. Load-securing device 106 can comprise a casing 201, a driveshaft 202, one or more assorted gears 203, one or more plate screw 204, and a plate 205. Casing 201 can be any enclosed case or materials that houses and protects driveshaft 202, gears 203, and plate screw 204. Outer side of casing 201 can attach load-securing device 106 to trailer 101. Driveshaft 202 can be any appropriate mechanical tool used for transmitting torque, and rotation to gears 203. In one embodiment, driveshaft 202 can be made from a metallic or other durable material rod that mounts in casing 201. In one embodiment, driveshaft 202 can be extended outside casing 201. For purposes of discussion, driveshaft 202 can comprise several parts including a head 202a, body 202b and a tail 202c. Head 202a and tail 202c can be outside casing 201. Body 202b can be enclosed in casing 201. Further, body 202b can comprise teeth, and cogs, or body 202b can be threaded, as shown in FIG. 2. In another embodiment, driveshaft 202 can be completely enclosed inside casing 201. As such, head 202a and tail 202c can also be enclosed in casing 201. Still in another embodiment, either just head 202a or just tail 202c can be enclosed in casing 201.

Driveshaft 202 can either be operated manually with a turning handle, or operated automatically using an electric motor. In one embodiment head 202a of driveshaft 202 can be a turning handle. As such, driveshaft 202 can be operated by manually rotating head 202a. Further, rotating head 202a can rotate driveshaft 202 and tail 202c accordingly. In another embodiment wherein driveshaft 202 is operated using an electric motor, driveshaft 202 can be operated automatically by triggering a button or a switch. Thus, when triggered electric motor can operate and rotate driveshaft 202.

One or more gears 203 can be any rotating device that comprises cut teeth, or cogs. As such the toothed part of gears 203 can mesh with another toothed part in order to create a rotational motion and transmit torque. For purposes of this device, gears 203 can be any type of gear, or any type of gear-like device such as sprockets.

Plate screw 204 can be a threaded shaft that can interact with gears 203 or driveshaft 202. Plate screw 204 can comprise two parts such as an unthreaded portion 204a and a threaded portion 204b. As such head 204a and thread 204b can be connected together and can be considered as a single device. Unthreaded portion 204a of plate screw 204 can comprise gear 203 or connect to gear while thread 204b is the helical ridge portion of plate screw 204 where plate 205 is attached. In one embodiment, plate screw 204 can be connected to gear 203. In another embodiment plate screw can comprise only a threaded portion, and can interact with gears 203 that also interact with drive shaft 202. In one embodiment plate screw 204 can be paired with another second plate screw 204. Plate screw 204 can be installed parallel to plate screw 204. As such plate screw 204 can go through a plate screw orifice in casing 201. In one embodiment, plate screw 204 and second plate screw 204 can be perpendicularly connected to driveshaft 202 by gear 203. In such embodiments, when driveshaft 202 rotates, plate screw 204 and second plate screw 204 can either rotate to the left or to the right, accordingly.

Plate 205 can comprise a connection portion 205a and a threaded plate orifice 205b. As such plate 205a and threaded plate orifice 205b for each plate screw can be attached together and can be considered as a single device. In an embodiment wherein plate screw 204 can be paired with plate screw 204 or a guide, two parallel threaded plate orifice 205b can be attached on plate 205. Plate screw 204 can be inserted through threaded plate orifice 205b. Further, when plate screw 204 rotates, plate 205 can move up and down, accordingly. Furthermore, strapping device 103 can be attached to connection portion 205a through hook 105 or other system and method known in the art. Thus, when plate 205 moves up or moves down, strapping device 103 can loosen or tighten, accordingly.

Figure 3:
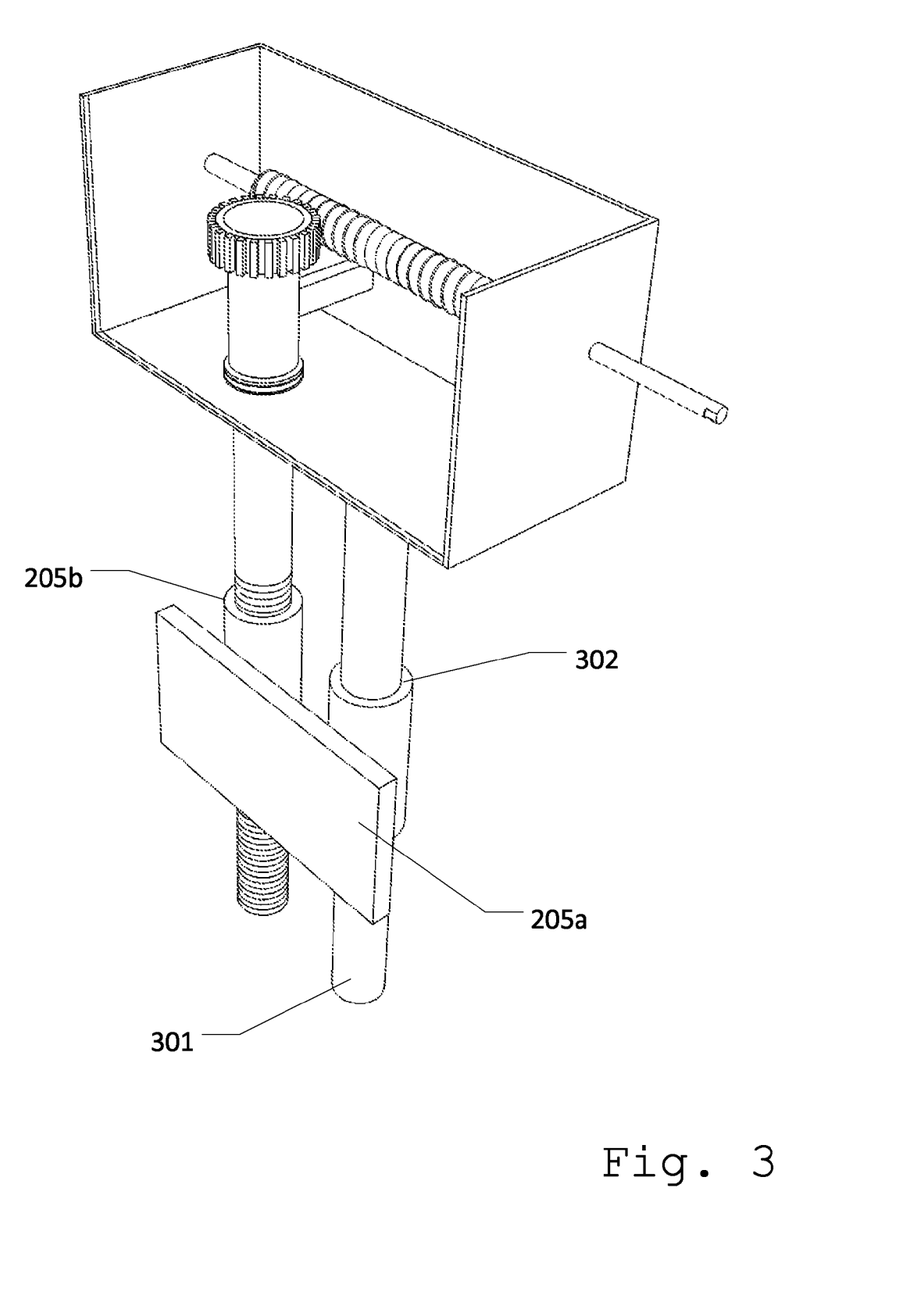
FIG. 3 illustrates a load-securing device comprising a plate screw and a guide.

FIG. 3 illustrates a load-securing device comprising plate screw 204 and a guide 301. In another embodiment, plate screw 204 can be paired with guide 301, as seen in FIG. 3. Guide 301 can be a rod parallel to plate screw 204, passing through a guide rail 302. In one embodiment, rail 302 can be an orifice. Neither guide 301 nor rail 302 need be threaded or comprise teeth or cogs, however in one embodiment, they can. Guide 301 can be attached to casing 201. Plate screw 204 can produce rotational force that can move plate 205 upward or downward, while guide 301 can serve as a guide that ensures plate 205 stays in place, thwarting rotational motion of plate 205, allowing plate 205 to move up and down plate screw 204.

Figure 4A:
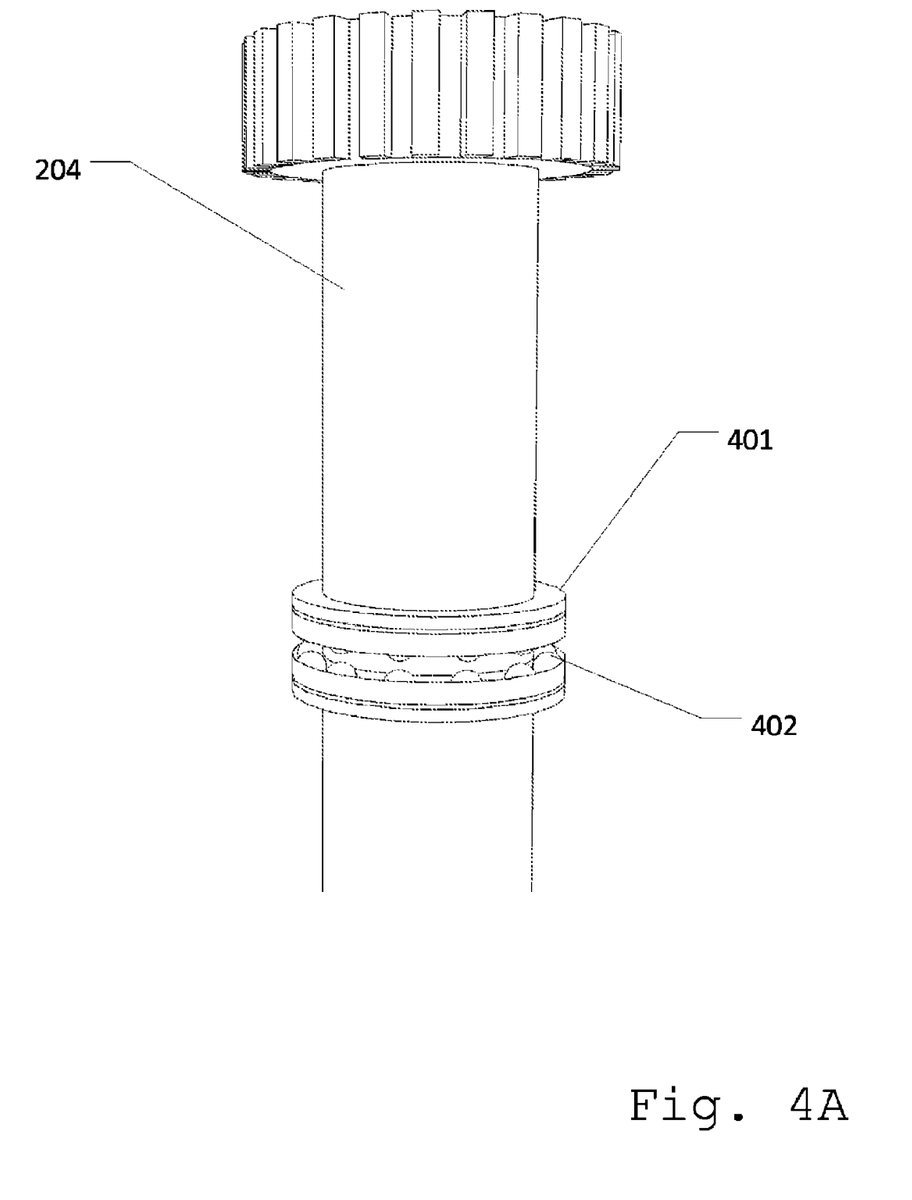
FIG. 4A illustrates bearing system connected to a plate screw.

FIG. 4A illustrates a friction reducing connection system 401 connected to plate screw 204. In one embodiment, plate screw 204 can have a friction reducing connection system 401 where plate screw 204 passes through casing 201. As such reducing connection system 401 can allow rotational motion of plate screw 204 and can also prevent plate screw 204 from slipping out of casing. In one embodiment, reducing connection system 401 can be a rolling-element bearing that can comprise balls. In such embodiment, bearing 402 can be used to reduce rotational friction and support axial movement of plate screw 204.

Figure 4B:
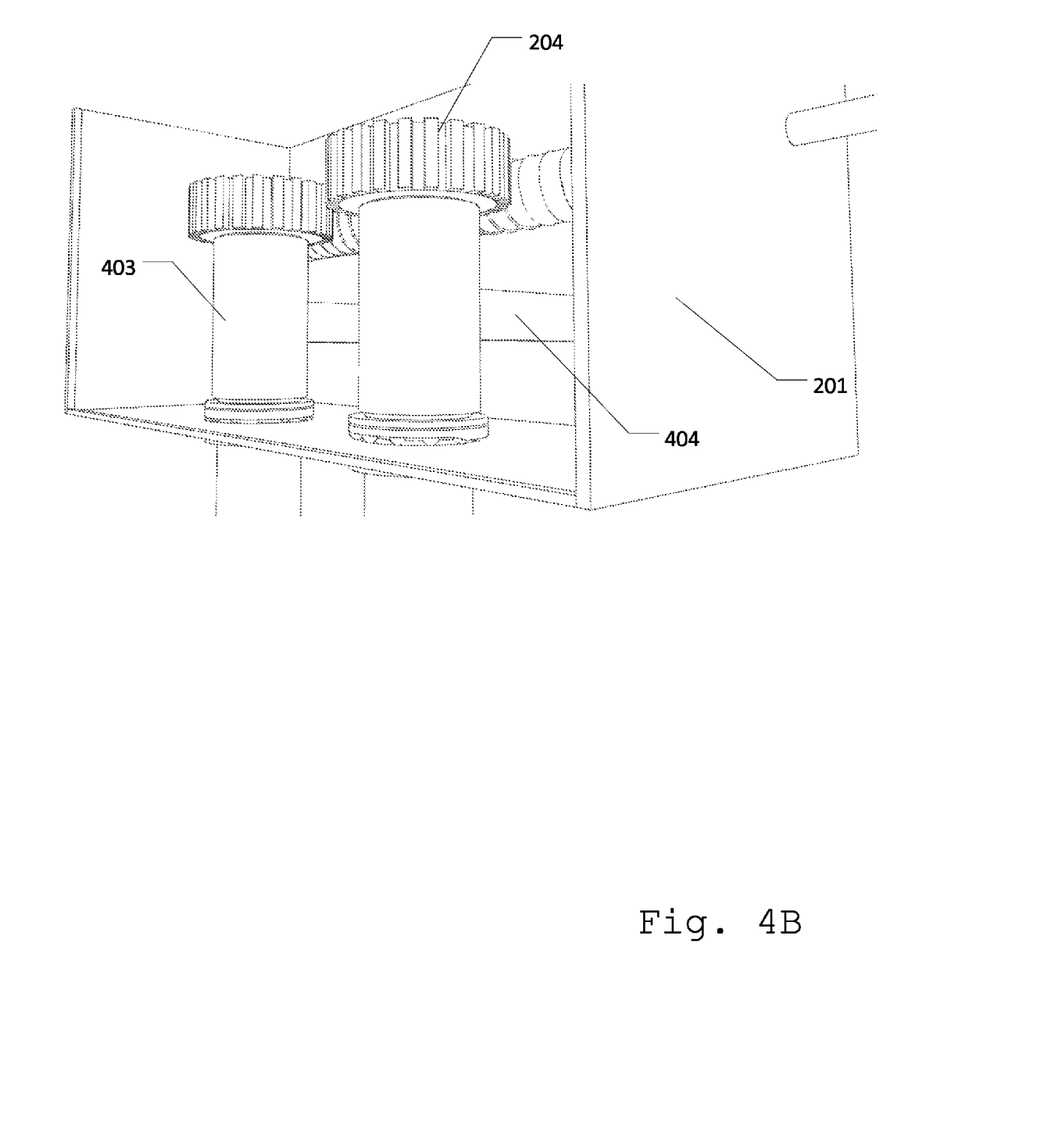
FIG. 4B illustrates a bearing system connecting plate screws to a casing.

FIG. 4B illustrates a friction reducing connection system 401, a plate screw guide 403, and a guide support 404 connecting plate screws 204 to casing 201. In one embodiment casing 201 can comprise plate screw guide 403 and guide support 404. In such embodiment, plate screw guide 403 and a guide support 404 can be used to secure plate screws 204 in place. Further, plate screw guide 403 and guide support 404 can be made of any hard material such as metals. As such, plate screw guide 403 can be a circular tube that can hold plate screw 204 in place. Guide support 404 can be a bar that can attach plate screw guide 403 to casing 201. Further, one end of guide support 404 can be permanently attached to the inner surface of casing 201, wherein the other end of guide support 404 can be attached securely to plate screw guide 403. Further in such embodiment, plate screw 204 can rotate freely within plate screw guide 403, as plate screw guide 403 and guide support 404 ensures plate screw 204 can be kept perpendicular with driveshaft 202.

Figure 5A:
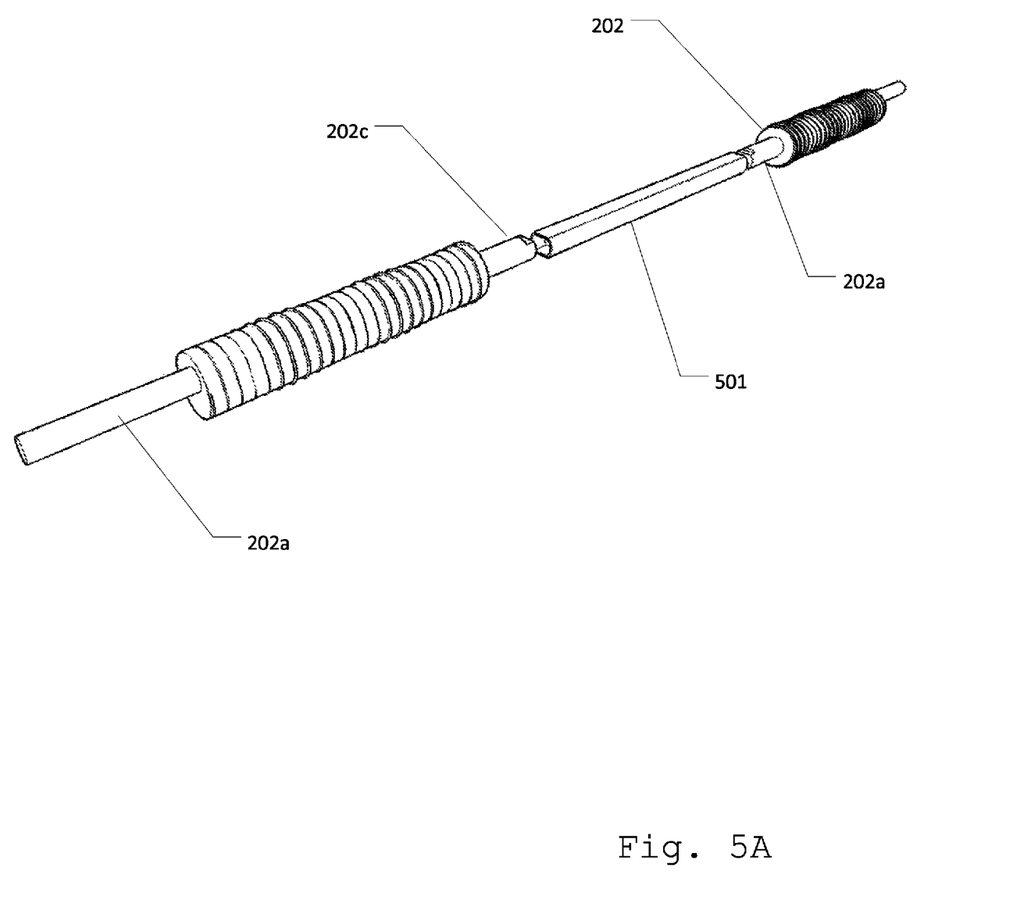
FIG. 5A illustrates an embodiment of a driveshaft.

FIG. 5A illustrates an embodiment of driveshaft 202. In one embodiment, an electric motor can be installed in each load-securing device 106. In another embodiment, an electric motor can be installed at the front or rear end of a trailer, and connected through an extension device 501 to load securing devices 106. In an embodiment wherein load-securing system 100 comprises of more than one load-securing device 106, load-securing devices 106 can be connected through driveshafts 202 using an extension device 501. In one embodiment, an extension device 501 can be a hard metal, which can be used to connect tail 202c of load-securing device 106 to head 202a of another load-securing device 106. In such embodiment, edges of head 202a and tail 202c of loading devices 106 can be designed as nuts. Further, both ends of extension device 501 can be designed as bolt. As such, head 202a of a load-securing device 106 and tail 202c of another load-securing device 106 can be screwed securely to extension device 501. In one embodiment, bolted joints can also be used to connect two or more load-securing devices 106. Extension device 501 discussed herein can use locking mechanisms on each end to ensure that joined parts of load-securing devices 106 are fastened securely with other devices.

In one embodiment, extension device 501 can be a long threaded shaft that can go through casings 201 of each load-securing device 106. Thus, extension device 501 can produce synchronous rotational motion to load securing devices 106. In such embodiment, extension device 501 is driveshafts 202.

Figure 5B:
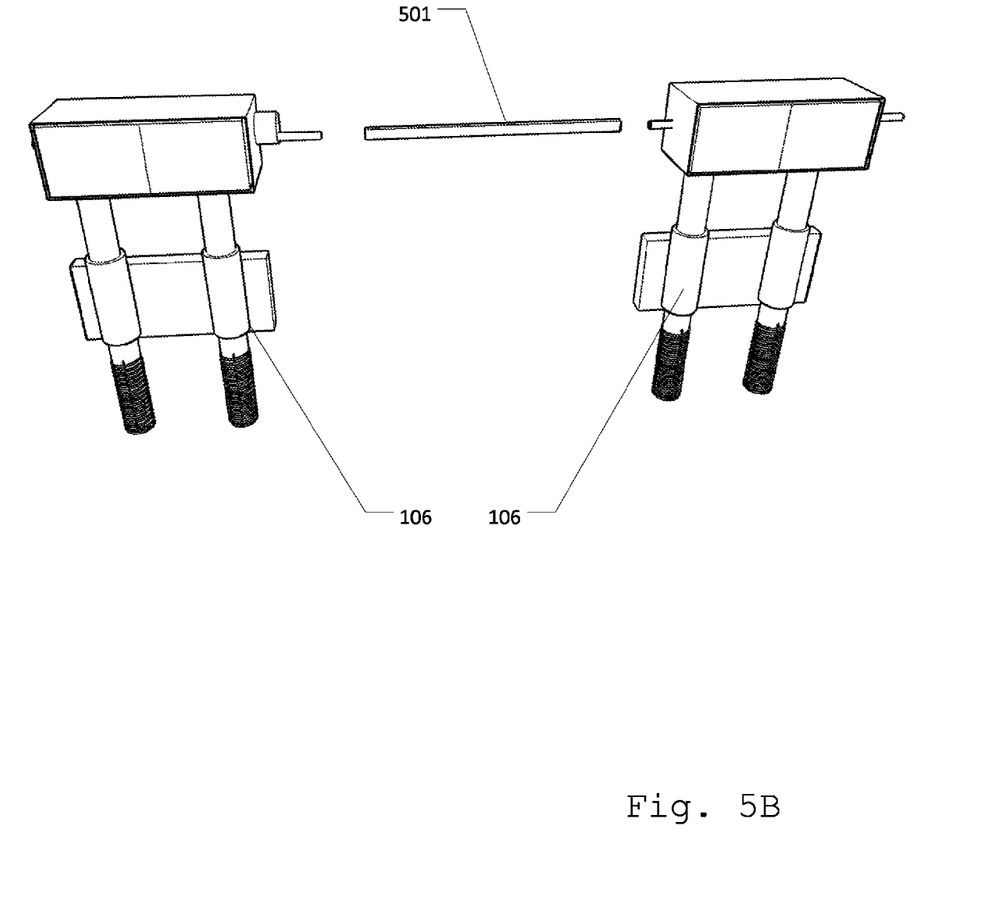
FIG. 5B illustrates a load-securing device as a system.

FIG. 5B illustrates a multiple load-securing device 106 system. In an embodiment wherein load-securing system 100 comprises of more than one load-securing device 106, load-securing devices 106 can be linked together as a system. In such embodiment load-securing device 106 can be connected together with another load-securing device 106 through wires through extension device 501 and wires and cables for power and/or communication. In one embodiment wherein load-securing device 106 uses a turning handle, load-securing device 106 can be connected to another load-securing device 106 through extension devices 501. As such when the turning handle of load-securing device 106 is rotated, load-securing devices 106 in the system will rotate in the same direction at the same time.

In another embodiment wherein load-securing device 106 uses an electric motor in a system, an electric motor or a lever can be attached at the back and/or front of trailer 101 and is used to operate load-securing devices 106. As such, when motor is activated, load-securing devices 106 can rotate in synchronous manner.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A load-securing device comprising
   a first casing mountable to a trailer, wherein said casing comprises a first front driveshaft access orifice and a first plate screw orifice;
   a first threaded driveshaft mounted in said casing wherein the first end of said first driveshaft is mateable with a first rotation actuator, further wherein the front end of said first threaded drive shaft is accessible by said first front driveshaft access orifice; and
   a first plate screw mounted to said first casing, wherein said first plate screw passes through said first plate screw orifice, further wherein said first plate screw is perpendicular to said first threaded driveshaft; and
   a first one or more gears configured to transfer rotational motion of said first front driveshaft to said first plate screw; and
   a first plate comprising a first threaded plate orifice, said first plate screw partially inside said first threaded plate orifice, further wherein said rotational motion of said first plate screw causes said first plate to move axially along said first plate screw.

2. The load securing device of claim 1, further comprising
   a second plate screw orifice in said first casing;
   a second plate screw mounted to said first casing, wherein said second plate screw passes through said second plate screw orifice, further wherein said second plate screw is perpendicular to said first threaded driveshaft;
   a second threaded plate orifice inside said first plate, said second plate screw partially inside said first threaded plate orifice, wherein rotational motion of said second plate screw causes said plate to move axially along said second plate screw; and
   a second one or more gears configured to transfer rotational motion of said first threaded driveshaft to said second plate screw.

3. The load securing device of claim 1 comprising
a guide parallel to said first plate screw orifice;
a guide-mate connected to said first plate, wherein said guide is mateable with said guide mate, further wherein rotational motion of said first plate screw causes said guide to connectively slide with said guide mate.

4. The load securing device of claim 3, wherein said guide-mate is a guide orifice within said first plate.

5. The load securing device of claim 1, wherein said first threaded drive shaft extends outside said first casing through said first drive shaft orifice.

6. The load securing device of claim 1, wherein said first casing further comprises a first rear driveshaft access orifice, further wherein the front end of said first threaded drive shaft is accessible by said first rear driveshaft access orifice.

7. The load securing device of claim 1, further comprising
a second casing mountable to a trailer, wherein said second casing comprises a second rear driveshaft access orifice and a second plate screw orifice;
a second threaded driveshaft mounted in said second casing, wherein the front end of said second drive shaft is accessible by said second front driveshaft access orifice; and
a second plate screw mounted to said second casing, wherein said second plate screw passes through said second plate screw orifice, further wherein said second plate screw is perpendicular to said second threaded driveshaft; and
a second one or more gears configured to transfer rotational motion of said second threaded driveshaft to said second plate screw; and
a second plate comprising a second threaded plate orifice, said second plate screw inside said second plate screw orifice, further wherein rotational motion of said second plate screw causes said second plate to move axially along said second plate screw.

8. The load-securing device of claim 7 wherein said first threaded drive shaft is said second rotation actuator.

9. The load securing device of 7, further comprising a second rotation actuator, wherein the front end of said second rotation actuator connects to the rear end of said first threaded driveshaft, and the rear end of said second rotation actuator connects to the front end of said second threaded driveshaft.

10. The load securing device of claim 1, wherein said first threaded driveshaft is said second threaded drive shaft.

11. The load securing device of claim 1, further comprising
a plate screw guide at least partially around said first plate screw; and
a guide support, the first end of said guide support connected to said plate screw guide, and said the second end of said guide support connected to said first casing.

12. The load securing device of claim 11, further comprising a bearing system attached to said first plate screw, a first portion of said bearing system outside the first end of said plate screw guide, and a second portion of said bearing system outside the second end of said plate screw guide.

13. The load securing device of claim 1, further comprising a bearing system attached to said first plate screw.

14. The load securing device of claim 13 wherein a first portion of said bearing system is outside said first casing, and a second portion of said bearing system is inside said first casing.

15. A method for securing a load to a truck comprising
connecting the first end of a strapping device to one side of a trailer;
placing said strapping device over a load on a trailer; and
connecting the second end of said strapping device to a plate, said plate comprising a threaded plate orifice, a first plate screw partially inside said first threaded plate orifice, further wherein said rotational motion of said first plate screw causes said first plate to move axially along said first plate screw, said plate screw mounted to a casing, wherein said first plate screw passes through first plate screw orifice in said casing, further wherein said first plate screw is perpendicular to a driveshaft; said driveshaft mounted in said casing wherein the first end of said driveshaft is mateable with a rotation actuator, further wherein the front end of said driveshaft is accessible by a front driveshaft access orifice in said casing; and
rotating said drive shaft with said rotation actuator.

* * * * *